(12) United States Patent
Xiang et al.

(10) Patent No.: US 8,834,740 B2
(45) Date of Patent: Sep. 16, 2014

(54) POLYCRYSTALLINE COBALT-NICKEL-MANGANESE TERNARY POSITIVE MATERIAL, PREPARATION METHOD THEREOF AND LITHIUM ION SECONDARY BATTERY

(75) Inventors: Qianxin Xiang, Guangdong (CN); Xiaolian Zhao, Guangdong (CN)

(73) Assignees: Shenzhen Zhenhua New Material Co., Ltd., Shenzhen, Guangdong (CN); Guizhou Zhenhua New Material Co., Ltd., Guiyang, Guizhou (CN)

( * ) Notice: Subject to any disclaimer, the term of this patent is extended or adjusted under 35 U.S.C. 154(b) by 255 days.

(21) Appl. No.: 13/138,945

(22) PCT Filed: Oct. 26, 2010

(86) PCT No.: PCT/CN2010/078116
§ 371 (c)(1),
(2), (4) Date: Oct. 28, 2011

(87) PCT Pub. No.: WO2011/054262
PCT Pub. Date: May 12, 2011

(65) Prior Publication Data
US 2012/0043500 A1 Feb. 23, 2012

(30) Foreign Application Priority Data
Nov. 9, 2009 (CN) .......................... 2009 1 0110132

(51) Int. Cl.
| | | |
|---|---|---|
| H01M 4/88 | (2006.01) | |
| C01G 45/12 | (2006.01) | |
| H01M 10/0525 | (2010.01) | |
| H01M 4/52 | (2010.01) | |
| H01M 4/04 | (2006.01) | |
| H01M 4/1391 | (2010.01) | |
| C01G 53/00 | (2006.01) | |
| H01M 4/131 | (2010.01) | |
| H01M 4/36 | (2006.01) | |
| C01G 51/00 | (2006.01) | |
| H01M 4/50 | (2010.01) | |
| H01M 4/525 | (2010.01) | |
| H01M 4/505 | (2010.01) | |
| H01M 4/02 | (2006.01) | |

(52) U.S. Cl.
CPC ........... *H01M 4/505* (2013.01); *C01P 2006/11* (2013.01); *C01G 45/1257* (2013.01); *H01M 10/0525* (2013.01); *H01M 4/523* (2013.01); *H01M 4/0471* (2013.01); *H01M 4/1391* (2013.01); *C01G 45/1228* (2013.01); *C01G 53/42* (2013.01); *C01P 2002/52* (2013.01); *C01P 2004/61* (2013.01); *H01M 4/131* (2013.01); *C01P 2006/40* (2013.01); *Y02E 60/122* (2013.01); *H01M 4/364* (2013.01); *C01G 51/42* (2013.01); *C01P 2002/72* (2013.01); *H01M 4/502* (2013.01); *C01G 51/50* (2013.01); *H01M 4/525* (2013.01); *H01M 2004/028* (2013.01); *C01G 53/50* (2013.01)
USPC ....... 252/182.1; 252/519.1; 427/77; 429/211; 429/218.1

(58) Field of Classification Search
USPC ................. 252/182.1, 519.1; 429/211, 218.1; 427/77
See application file for complete search history.

(56) References Cited

FOREIGN PATENT DOCUMENTS

| | | | | |
|---|---|---|---|---|
| CN | 101071859 | * | 11/2007 | .............. H01M 4/04 |
| CN | 101369651 | * | 2/2009 | .............. H01M 4/04 |
| CN | 101626080 | * | 1/2010 | .............. H01M 4/58 |
| KR | 20100099359 | * | 9/2010 | ............ H01M 10/44 |

* cited by examiner

*Primary Examiner* — Khanh Tuan Nguyen
(74) *Attorney, Agent, or Firm* — Raymond Y. Chan; David and Raymond Patent Firm

(57) ABSTRACT

A polycrystalline cobalt-nickel-manganese ternary positive material is provided. The polycrystalline cobalt-nickel-manganese ternary positive material comprises more than two basic crystalline structures of $Li_z$—$CoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$. Further, a method for preparing the positive material by high-temperature fusion is provided. The positive material has the compacted density of 3.9-4.3 g/cm$^3$, the capacity of 145 mAh/g or more when the discharging rate is 0.5-1C and the capacity retention rate of more than 90% after 300 cycles. The positive material prepared by high-temperature fusion has high volume energy density, excellent electrochemical performance, and improved safety and is manufactured economically. Further, a lithium ion secondary battery comprising the positive material is provided.

2 Claims, 9 Drawing Sheets

US 8,834,740 B2

POLYCRYSTALLINE COBALT-NICKEL-MANGANESE TERNARY POSITIVE MATERIAL, PREPARATION METHOD THEREOF AND LITHIUM ION SECONDARY BATTERY

BACKGROUND OF THE PRESENT INVENTION

1. Field of Invention

The present invention relates to a kind of anode material of a lithium ion battery, its preparation method thereof and a lithium ion battery which utilize the anode material, and more particularly to a cobalt-nickel-manganese ternary material and its preparation method, and a lithium ion secondary battery which make use of the cobalt-nickel-manganese ternary material.

2. Description of Related Arts

Since Lithium-ion battery has been commercialized in 1991, its application requirements are increased continuously, and its energy density requirement has also increased with the market development. Specifically, the energy density of lithium-ion battery can be divided into mass density and bulk density, and the market requires the increase of both of the density by mass and the density by volume of the battery. Under the condition of providing a unit capacity, increasing the energy density of the battery means increasing the filling capacity of unit volume of the active substance of the battery. At present, the most widely used material is still lithium cobalt oxide. Lithium cobalt oxide is the earliest commercialized material, its application development is already mature and is widely used in many small scale low voltage portable electronic products such as mobile phone, laptop and digital electronic devices. However, since there is limited resources and higher safety requirement, a new research direction which focuses on providing a low cost, high energy density and high safety level battery without or with low content of cobalt for anode material of lithium battery has been developed. The continuous development has resulted in a cobalt-nickel-manganese ternary material and a manganese series material which has a capacity exceeding the lithium cobalt oxide and a safety level which is higher than the lithium cobalt oxide while the cost is lowered. However, certain discoveries are found during analysis of the ternary material: the discharging voltage of the ternary material is low, the compaction density of the electrode plate is low, which is lower than the compaction density of the lithium cobalt oxide, and therefore the single cobalt-nickel-manganese ternary material and the manganese series material cannot fulfill the market demand which requires high performance anode materials. The cobalt-nickel-manganese ternary material and the manganese series material cannot replace the conventional lithium cobalt oxide to use in the high end lithium-ion secondary battery. The conventional preparation method generally includes a machine for mixing two materials so that the cost is lowered and the safety is increased through providing the material mixture. For example, LiCoO2 and LiMn2O4 are the two mixing materials which are employed by SONY to solve the overcharge problem and improve the thermal stability. However, this simple act of physical mixing will affect the performance of the materials, for example, the compaction density is decreased accordingly and the volumetric capacity is only a direct average value of the two mixing materials.

SUMMARY OF THE PRESENT INVENTION

An object of the present invention is to provide a polycrystalline cobalt-nickel-manganese ternary anode material, its preparation method and a secondary lithium-ion battery so as to increasing a volumetric energy density, a safety level and a discharge potential while lowering the cost of manufacture.

Additional advantages and features of the invention will become apparent from the description which follows, and may be realized by means of the instrumentalities and combinations particular point out in the appended claims.

According to the present invention, the foregoing and other objects and advantages are attained by the followings: a polycrystalline cobalt-nickel-manganese ternary anode material, wherein the polycrystalline cobalt-nickel-manganese ternary anode material includes two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y is smaller than 1, z is greater than or equal to 1, wherein the lattice structure is a polycrystalline layered structure, wherein a molar ratio of element cobalt:nickel:manganese is 1~1.2:0.4~0.7:0.2~0.5: 0.1~0.3, its particle size is between 8~12 micron, wherein the polycrystalline anode material has a compaction density of 3.9~4.3 g/cm³, and a capacity which is greater than or equal to 145 mAh/g at a discharge current of 0.5~1 C, a capacity retention rate which is greater than 90% after 300 cycles.

A preparation method of polycrystalline cobalt-nickel-manganese ternary anode material, comprising the following steps of: (1) preparation of precursor: add 6~25 g of polyethylene glycol into a 300~500 ml lithium solution which is 1.0~1.2 mol/L LiAc, LiOH or $LiNO_3$, add more than one salt compound of cobalt, nickel and manganese by dropping to form a mixture, mix the mixture at 20~60° C. with a rotational speed of 20~120 rpm for 120 min, where a total content of cobalt, nickel and manganese is 0.3~1.0 mol, place directly in a box typed furnace at 150~250° C. for drying 2~10 hours, ball milling at a rotational speed of 200~1000 rpm for 30 min for dispersion to obtain the precursor which is an oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where x, y and x+y is smaller than 1, and z is greater than or equal to 1; (2) preparing a polycrystalline cobalt-nickel-manganese ternary anode material by sintering with the precursor: mix at least two of the oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where a molar ratio of cobalt:nickel:manganese is 1~1.2:0.4~0.7:0.2~0.5:0.1~0.3, mix uniformly at a rotational speed of 200~1000 rpm for 60 min by ball milling to form a mixture, place the mixture into a box typed furnace directly at 750~950° C. for 5~15 hours for sintering, cool naturally to room temperature, jet milling at a pressure of 0.4~1.0 Mpa, obtain the polycrystalline cobalt-nickel-manganese ternary anode material; or prepare by sintering with intermediate: place the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ into a box typed furnace directly at 600~850° C. for 5~15 hours for sintering, where a molar ratio of cobalt:nickel:manganese is 1~1.2:0.4~0.7:0.2~0.5: 0.1~0.3, then ball milling at least two of the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ at a rotational speed of 500 rpm for 6 for mixing uniformly, then place directly in a box typed furnace at 750~980° C. for 4~10 hours for sintering, cool naturally to room temperature, jet milling at a pressure of 0.4~1.0 Mpa, obtain the polycrystalline cobalt-nickel-manganese ternary anode material; or by sintering with a final product: place the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ respectively directly in a box typed furnace at 850~980° C. for 5~10 hours for sintering, jet milling at a pressure of 0.5 Mpa, screen to obtain a particle size D50 which is equal to 8~20 micron, mix at least two of the $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ uniformly, place directly in a box typed furnace at 350~850° C. for 0.5~5 hours for sintering, jet milling at a pressure of 0.4~1.0 Mpa, and obtain the polycrystalline cobalt-nickel-manganese ternary anode material.

According to the preparation method of the present invention, the cobalt, nickel, and manganese salt compound belongs to hydroxy, oxalate or carbonate compound respectively.

According to the method of the present invention, after jet milling, process screening to control a particle size of which D50 is equal to 8~20 micron.

A preparation method of polycrystalline cobalt-nickel-manganese ternary anode material, comprising the following steps of: (1) preparation of precursor: prepare a 16% nitrate solution from a nitrate containing two or more of Co, Ni, Mn in which a total concentration of Co, Ni, Mn is 0.5~1.0 mol, dropping and adding lithium nitrate solution under 30~80° C. at a rotational speed of 120 rpm, wherein a content of the lithium in the lithium nitrate solution is 1.0~1.2 mol and a concentration is 10~25%, allowing reaction for 60~120 min, place directly into a box typed furnace and dry under 150~250° C. for 2~10 hours, ball milling under a rotational speed of 200~1000 rpm for 30 min, obtain the precursor which is an oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where x, y and x+y is smaller than 1, and z is greater than or equal to 1; (2) preparing a polycrystalline cobalt-nickel-manganese ternary anode material, by sintering with the precursor: mix at least two of the oxide precursor of $Li_zCoO_2$, $Li_zNiO_2$, $Li_zMnO_2$, $Li_zCo_{1-(x+y)}Ni_xMn_yO_2$, $Li_zCo_xNi_{1-x}O_2$ or $Li_2MnO_3$, where a molar ratio of cobalt:nickel:manganese is 1~1.2:0.4~0.7:0.2~0.5:0.1~0.3, mix uniformly at a rotational speed of 200~1000 rpm for 60 min by ball milling to form a mixture, place the mixture into a box typed furnace directly at 750~950° C. for 5~15 hours for sintering, cool naturally to room temperature, jet milling at a pressure of 0.4~1.0 Mpa, obtain the polycrystalline cobalt-nickel-manganese ternary anode material; or prepare by sintering with intermediate: place the precursor of $Li_zCoO_2$, $Li_2NiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ into a box typed furnace directly at 600~850° C. for 5~15 hours for sintering, where a molar ratio of cobalt:nickel:manganese is 1~1.2:0.4~0.7:0.2~0.5:0.1~0.3, then ball milling at least two of the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ at a rotational speed of 500 rpm for 60 min for mixing uniformly, then place directly in a box typed furnace at 750~980° C. for 4~10 hours for sintering, cool naturally to room temperature, jet milling at a pressure of 0.4~1.0 Mpa, obtain the polycrystalline cobalt-nickel-manganese ternary anode material; or by sintering with a final product: place the precursor of $Li_zCoO_2$, $Li_zNiO_2$, $Li_zMnO_2$, $Li_zCo_{1-(x+y)}Ni_xMn_yO_2$, $Li_zCo_xNi_{1-x}O_2$ and $Li_2MnO_3$ respectively directly in a box typed furnace at 850~980° C. for 5~10 hours for sintering, jet milling at a pressure of 0.5 Mpa, screen to obtain a particle size D50 which is equal to 8~20 micron, mix at least two of the $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ uniformly, place directly in a box typed furnace at 350~850° C. for 0.5~5 hours for sintering, jet milling at a pressure of 0.4~1.0 Mpa, and obtain the polycrystalline cobalt-nickel-manganese ternary anode material.

According to the method of the present invention, after jet milling, process screening to control a particle size of which D50 is equal to 8~20 micron.

A dynamic Li-ion secondary battery which includes an anode material, wherein the anode material has two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y is smaller than 1, z is greater than or equal to 1, wherein the lattice structure is a polycrystalline layered structure, wherein a molar ratio of element cobalt:nickel:manganese is 1~1.2:0.4~0.7:0.2~0.5:0.1~0.3, its particle size is between 8~12 micron, wherein the polycrystalline anode material has a compaction density of 3.9~4.3 g/cm$^3$, and a capacity which is greater than or equal to 145 mAh/g at a discharge current of 0.5~1 C, a capacity retention rate which is greater than 90% after 300 cycles.

Compared to conventional technology, the present invention provides a preparation method of a precursor, prepares a polycrystalline cobalt-nickel-manganese ternary anode material through fusion at high temperature, makes use of different anode material to intergrow into one unique structure and combines the advantages of mixture material to prepare a polycrystalline anode material which has good electrochemical performance with higher energy density, higher safety level and lower manufacture cost.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
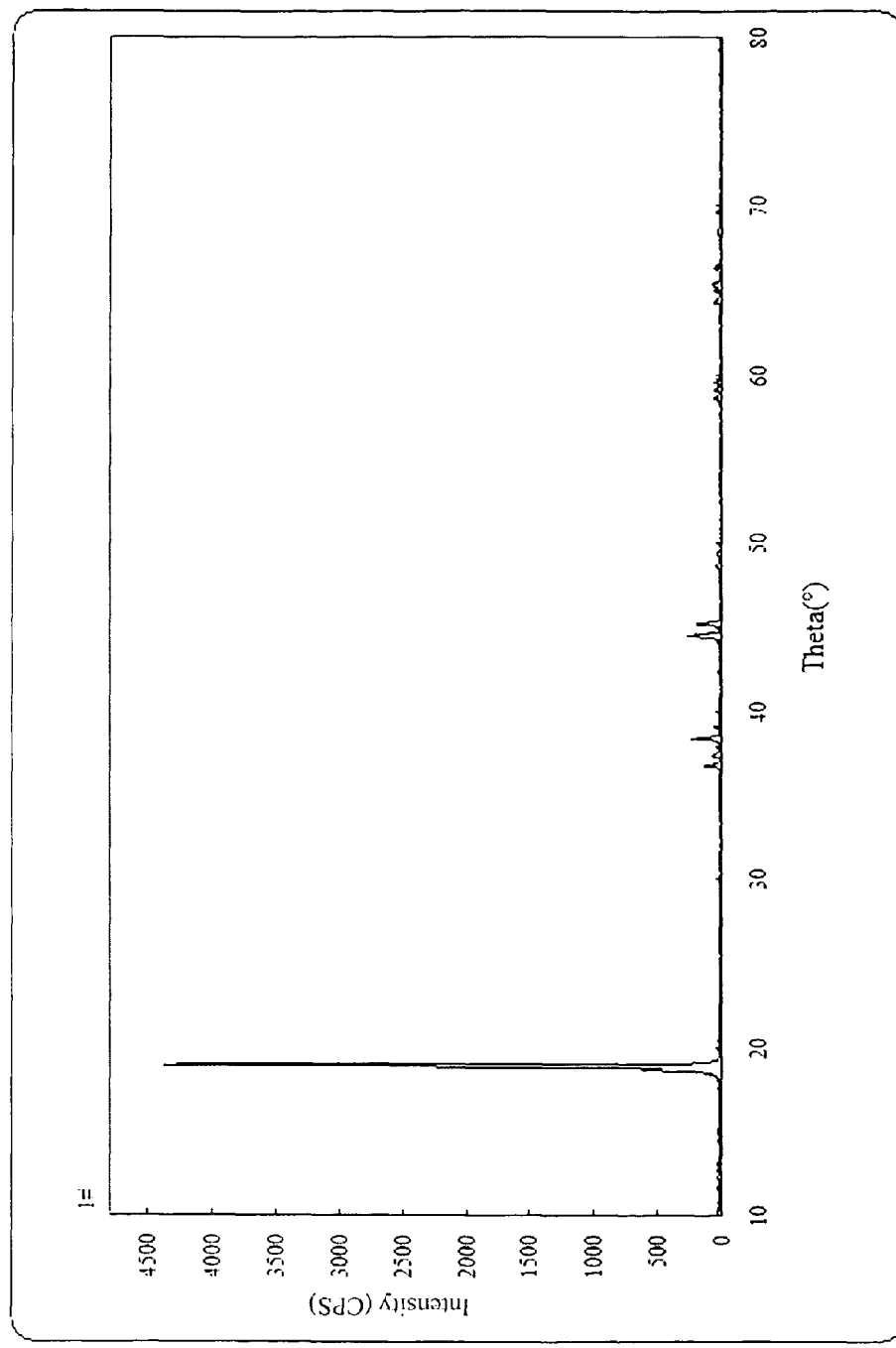
FIG. 1 is a spectrum showing an X-ray diffraction pattern according to an exemplary embodiment 7 of a preferred embodiment of the present invention.

The present invention is further described through the following exemplary embodiments and the accompanying drawings. According to a preferred embodiment of the present invention, a polycrystalline cobalt-nickel-manganese ternary anode material, wherein the polycrystalline cobalt-nickel-manganese ternary anode material includes two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y is smaller than 1, z is greater than or equal to 1, wherein the lattice structure is a polycrystalline layered structure, wherein a molar ratio of element cobalt:nickel:manganese is 1~1.2:0.4~0.7:0.2~0.5:0.1~0.3, its particle size is between 8~12 micron, wherein the polycrystalline anode material has a compaction density of 3.9~4.3 g/cm$^3$, and a capacity which is greater than or equal to 145 mAh/g at a discharge current of 0.5~1 C, a capacity retention rate which is greater than 90% after 300 cycles. The process ability is high while the electrode plate will not fall off easily.

According to the preferred embodiment of the present invention, a preparation method of polycrystalline cobalt-nickel-manganese ternary anode material is provided which comprises the following steps:

I. Preparation of Precursor:

Method 1: add 6~25 g of polyethylene glycol into a 300~500 ml lithium solution which is 1.0~1.2 mol/L LiAc, LiOH or LiNO$_3$, add more than one salt compound of cobalt, nickel and manganese by dropping to form a mixture, mix the mixture at 20~60° C. with a rotational speed of 20~120 rpm for 120 min, where a total content of cobalt, nickel and manganese is 0.3~1.0 mol, place directly in a box typed furnace at 150~250° C. for drying 2~4 0 hours, ball milling at a rotational speed of 200~1000 rpm for 30 min for dispersion to obtain the precursor which is an oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where x, y and x+y<1, and z≥1.

Method 2: prepare a 16% nitrate solution from a nitrate containing two or more of Co, Ni, Mn in which a total concentration of Co, Ni, Mn is 0.5~1.0 mol, dropping and adding lithium nitrate solution under 30~80° C. at a rotational speed of 20~120 rpm, wherein a content of the lithium in the lithium nitrate solution is 1.0~1.2 mol and a concentration is 10~25%, allowing reaction for 60~120 min, place directly into a box typed furnace and dry under 150~250° C. for 2~10 hours, ball milling under a rotational speed of 200~1000 rpm for 30 min, obtain the precursor which is an oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where x, y and x+y<1, and z≥1.

II. Preparation of a Polycrystalline Cobalt-Nickel-Manganese Ternary Anode Material:

Method 1: by sintering with the precursor: mix at least two of the oxide precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ or $Li_2MnO_3$, where a molar ratio of cobalt:nickel:manganese is 1~1.2:0.4~0.7:0.2~0.5:0.1~0.3, mix uniformly at a rotational speed of 200~1000 rpm for 60 min by ball milling to form a mixture, place the mixture into a box typed furnace directly at 750~950° C. for 5~15 hours for sintering, cool naturally to room temperature, jet milling at a pressure of 0.4~1.0 Mpa, screen to control and obtain a particle size D50=8~20 micron, obtain the polycrystalline cobalt-nickel-manganese ternary anode material.

Method 2: by sintering with intermediate: place the precursor of Li, $CoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ respectively into a box typed furnace directly at 600~850° C. for 5~15 hours for initial sintering, where a molar ratio of cobalt:nickel:manganese is 1~1.2:0.4~0.7:0.2~0.5:0.1~0.3, then ball milling at least two of the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ which is treated with initial sintering at a rotational speed of 500 rpm for 60 min for mixing uniformly, then place directly in a box typed furnace at 750~980° C. for 4~10 hours for sintering, cool naturally to room temperature, jet milling at a pressure of 0.4~1.0 Mpa, screen to control and grading a particle size D50=8~20 micron, obtain the polycrystalline cobalt-nickel-manganese ternary anode material.

Method 3: by sintering with a final product: place the precursor of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ respectively directly in a box typed furnace at 850~980° C. for 5~10 hours for sintering, jet milling at a pressure of 0.5 Mpa, screen to obtain a particle size D50=8~20 micron, then mix at least two of the $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$ and $Li_2MnO_3$ uniformly, place directly in a box typed furnace at 350~850° C. for 0.5~5 hours for sintering, jet milling at a pressure of 0.4~1.0 Mpa, screen and grading to control a particle size D50=8~20 micron, and obtain the polycrystalline cobalt-nickel-manganese ternary anode material.

According to the preparation method of the present invention, the device for drying and dehydration: Box typed furnace from Yixing Qianjin Furnace Equipment Co. Ltd., model: KSF1100-V, the grinding equipment: ball milling machine from Lianyungang Chunlong Experimental Equipment Company, model: SHQM, the jet milling device: MX-50 jet milling machine from Yixing Juneng Milling Machinery Company, the grading equipment: Standard inspection test sieve from Xinxiang Tongyi Machinery Equipment Company, model: TY-200A. The analytical instruments used: JSM6360 Scanning Electron Microscope from Japan Electronics, D/max-2200 pcXRD X-ray diffraction machine from Japan Rigaku, LS602 Laser Particle Size Analyzer from Zhuhai Omec-Tec, FZS4-4B Tap Density Apparatus from Beijing CISR1, Pioneer2002 surface analyzer, which are used for testing and analyzing the polycrystalline cobalt-nickel-manganese ternary anode material prepared by the preparation method of the present invention.

According to the preferred embodiment of the present invention, the secondary lithium ion battery includes an anode, a cathode, a non-aqueous electrolyte, a membrane and a container. The anode includes an anode collector and an anode active substance which is coated on the anode collector, the anode active substance is two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y<1, z≥1, wherein the lattice structure is a polycrystalline layered structure, wherein a molar ratio of element cobalt:nickel:manganese is 1~1.2:0.4~0.7:0.2~0.5:0.1~0.3, a particle size of the polycrystalline cobalt-nickel-manganese ternary anode material is between 8~12 micron, wherein the polycrystalline anode material has a compaction density which is greater than 3.9 g/cm$^3$. The cathode includes a cathode collector and a cathode active substance coated onto the cathode collector. The membrane includes a pure insulating layer in solid state or a solid with conducting ability, which is used to separate the cathode from anode. The container is a body for the anode, the cathode, the membrane and the electrolyte.

According to the preferred embodiment of the present invention, the secondary lithium ion battery for testing is manufactured by using the polycrystalline cobalt-nickel-manganese ternary anode material of the present invention. Preparation of anode: Mix the polycrystalline cobalt-nickel-manganese ternary anode material prepared by the method of the present invention and a conductive carbon black which constitutes to 3.0% of mass ratio of the anode material with an adhesive PVDF which constitutes to 3% of the mass ratio to form a mixture material. Then, add N-methylpyrrolidone (NMP) based on a mass ratio of the mixture material to NMP of 1:1. Mix uniformly to form a paste material, apply the paste material onto the aluminum foil collector, dry and press into an electrode plate. Preparation of cathode: Mix the active substance mesocarbon microbead MCMB in intermediate state and a conductive agent S—P which constitutes to 2% of mass ratio of the active substance of the cathode material with an adhesive PVDF which constitutes to 10% of the mass ratio to form a mixture material. Then, add N-methylpyrrolidone (NMP) based on a mass ratio of the mixture material to NMP of 1:1. Mix uniformly to form a paste material, apply the paste material onto the aluminum foil collector, dry and press into an electrode plate. Membrane is PP composite material. Container includes an aluminum body which has an insulating layer and a battery cover which has an electrode passage for an electrode latch. Spot welding the anode and cathode plate into the electrode latch, insert the membrane, install a coil onto a coil machine and put it into the aluminum body, placing the latch to protrude outside the battery cover and sealing the electrode passage with glue. Welding and sealing the aluminum body and the battery cover tightly. Inject electrolyte which is a mixture having a mass ratio EC:DEC:DMC=1:1:1 under condition in which the relative humidity is less than 1.5%. The electrolyte is 1M lithium hexafluorophosphate. Seal after injection. The model of the battery is "square 053048".

The active substance for cathode can also be carbon or non-carbon substance which allow lithium ion exchange into or out of the substance, such as $Li_4Ti_5O_{12}$, non-crystalline tin oxide, $WO_2$, $MoO_2$, $TiS_2$ and carbon compound having ions which can enter and leave the lithium-ion. Carbon compound which has this property includes graphite, non-oriented graphite, coke, carbon fiber, spherical carbon, sintered resin carbon, vapor grown carbon and nano-carbon tube. Because the cathode of the above specified carbon fiber or spherical carbon has superior charging efficiency, it is particularly preferred to use an asphalt base carbon fiber with intermediate phase or an asphalt base spherical carbon with intermediate phase as the carbon compound. The asphalt base carbon fiber with intermediate phase or the asphalt base spherical carbon with intermediate phase can be obtained through conventional method. Non-aqueous electrolyte is obtained by providing lithium in a metal lithium salt $LiPF_6$ as the electrolyte solution which is dissolved in non-aqueous solvent of ethylene carbonate or dimethyl carbonate. The membrane will not dissolve in the above non-aqueous solvent and is a porous membrane manufactured by polyethylene and polypropylene resin, or is an electrolyte in solid state which is a gelatin containing composition obtained from a non-aqueous electrolyte solvent by plasticized polymerization. The membrane can also be a non-woven synthetic resin, a polyethylene porous membrane or a polypropylene porous membrane.

The secondary lithium-ion battery of the present invention is tested with charging-discharging testing which follows the testing method GB/T18287-2000 and is preformed in a BS-9360 series battery testing cube in Guangzhou Kinte Insusery Company Limited. In term of volumetric capacity per unit electrode: compared with the anode material which has the volumetric capacity, when the electrode has a higher compaction density, the unit volume of the electrode has more active substance. Accordingly, the unit volume can have higher capacity, where the equation is: electrode compaction density $(g/cm^3)$*initial capacity (mAh/g).

I. Preparation of Precursor

Embodiment 1 provide 6 g polyethylene glycol and add to 300 ml LiAc solution which has a concentration of 1.00 mol/L, add 40 g cobalt carbonate to mix uniformly with a speed of 120 rin/min for a time period of 120 min, where a content of cobalt is 0.3 mol, then dry under 150° C. for 2 hours, grind and disperse by ball milling at a speed of 1000 rin/min for a time period of 30 min, obtain the $LiCoO_2$ precursor.

Embodiment 2 provide 25 g polyethylene glycol and add to 500 ml $LiNO_3$ solution which has a concentration of 1.20 mol/L, mix uniformly, add a mixture which includes 21 g cobalt carbonate, 21 g nickel carbonate and 22 g manganese carbonate which is well mixed together, where a content of cobalt is 0.16 mol, a content of nickel is 0.16 mol and a content of manganese is 0.16 mol, mix under 60° C. with a rotational speed of 20 rpm for 120 min, then dry under 250° C. for 2 hours for drying and dehydration process, grind and disperse by ball milling at a speed of 200 rpn/min for a time period of 30 min, obtain the $LiCo_{1/3}Ni_{1/3}Mn_{1/3}O_2$ precursor.

Embodiment 3 provide 20 g polyethylene glycol and add to 500 ml LiOH solution which has a concentration of 1.10 mol/L, mix uniformly, add a mixture which includes 13 g cobalt carbonate, 25 g nickel carbonate and 26 g manganese carbonate which are well mixed together, where a content of cobalt is 0.1 mol, a content of nickel is 0.2 mol and a content of manganese is 0.2 mol, mix under 40° C. with a rotational speed of 50 rpm for 120 min, then dry under 200° C. for 6 hours for drying and dehydration process, grind and disperse by ball milling at a speed of 600 rpm/min for a time period of 30 min, obtain the $LiCo_{1/5}Ni_{2/5}Mn_{2/5}O_2$ precursor.

Embodiment 4 dissolve $Co(NO_3)_2.6H_2O$ in which a content of cobalt is 0.2 mol, $Ni(NO_3)_2.6H_2O$ in which a content of nickel is 0.5 mol and 50% $Mn(NO_3)_2$ in which a content of manganese is 0.3 mol into 1000 g water to form a solution with a concentration of 16%, maintain the temperature at 30° C., drop and add 15% lithium nitrate solution at a rotational speed of 20 rpm, wherein a content of the lithium in the lithium nitrate solution is 1.2 mol, allow reaction for 60 min, place directly into a box typed furnace and dry under 150° C. for 10 hours, ball milling under a rotational speed of 1000 rpm for 30 min, obtain the precursor of $LiCo_{2/10}Ni_{5/10}Mn_{3/10}O_2$.

Embodiment 5 dissolve $Co(NO_3)_2.6H_2O$ of which a content of cobalt is 0.1 mol, $Ni(NO_3)_2.6H_2O$ of which a content of nickel is 0.2 mol and 50% $Mn(NO_3)_2$ of which a content of manganese is 0.2 mol into 580 g water to form a solution with a concentration of 16%, maintain the temperature at 30° C., gradually drop and add 15% lithium nitrate solution at a rotational speed of 20 rpm, wherein a content of the lithium in the lithium nitrate solution is 1.0 mol, allow reaction for 60 min, place directly into a box typed furnace and dry under 200° C. for 6 hours, ball milling under a rotational speed of 1000 rpm for 30 min, obtain the precursor of $LiCo_{1/5}Ni_{2/5}Mn_{2/5}O_2$.

Embodiment 6 dissolve $Co(NO_3)_2.6H_2O$ of which a content of cobalt is 0.2 mol, $Ni(NO_3)_2.6H_2O$ of which a content of nickel is 0.2 mol and 50% $Mn(NO_3)_2$ of which a content of manganese is 0.2 mol into 610 g water to form a solution with a concentration of 16%, maintain the temperature at 30° C., gradually drop and add 15% lithium nitrate solution at a rotational speed of 20 rpm, wherein a content of the lithium in the lithium nitrate solution is 1.1 mol, allow reaction for 60 min, place directly into a box typed furnace and dry under 250° C. for 3 hours, ball milling under a rotational speed of 1000 rpm for 30 min, obtain the precursor of $LiCo_{1/3}Ni_{1/3}Mn_{1/3}O_2$.

II. Preparation of Polycrystalline Composition Material

The parameters for sintering with precursor in embodiment 7-9 is shown in Table 1 and the electrical performance is shown in Table 4.

Referring to FIG. 1, the crystal in embodiment 7 includes: $LiCoO_2$ and $LiCo_{1/3}Ni_{1/3}Mn_{1/3}O_2$.

Figure 2:
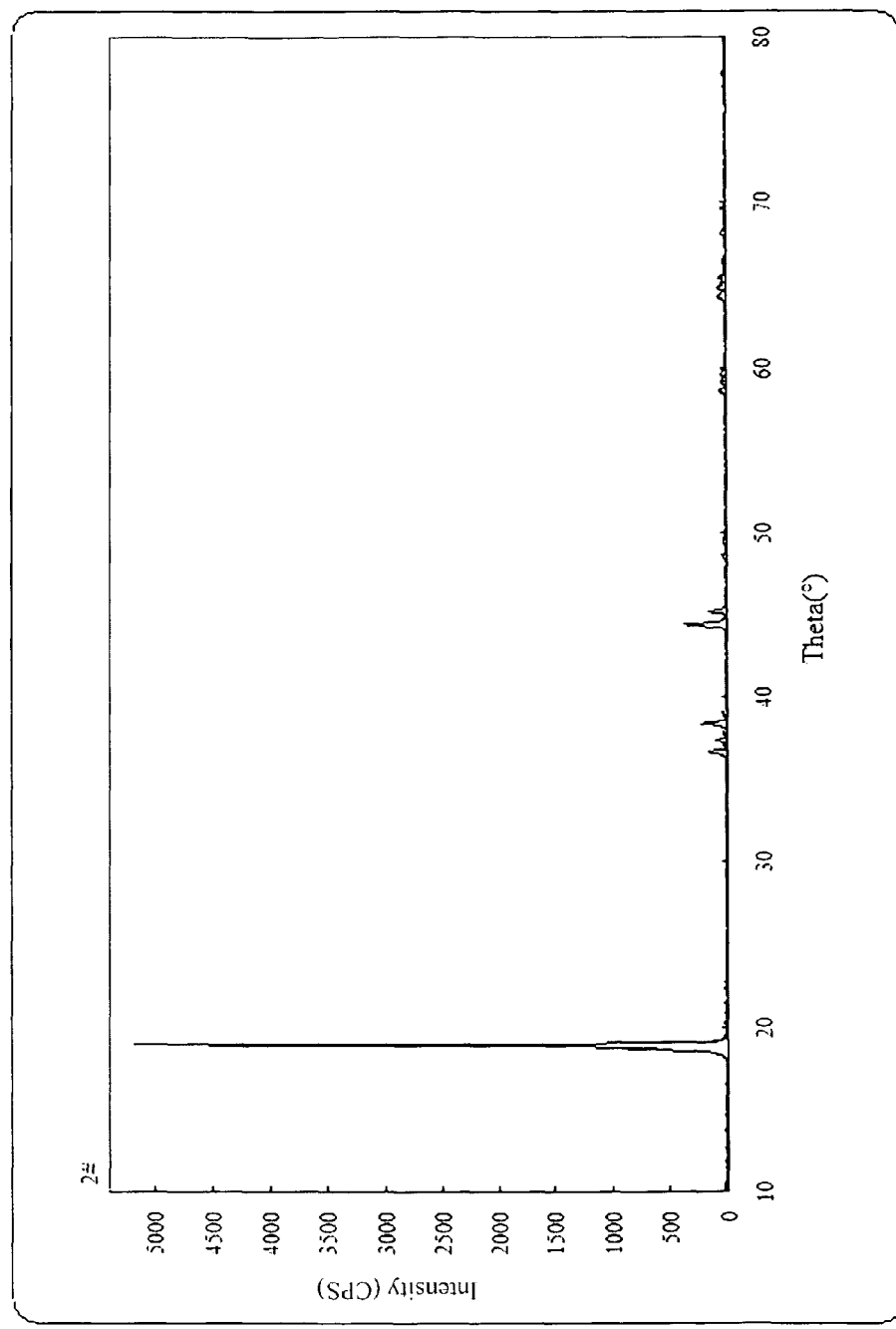
FIG. 2 is a spectrum showing an X-ray diffraction pattern according to an exemplary embodiment 8 of the above preferred embodiment of the present invention.

Referring to FIG. 2, the crystal in embodiment 8 includes: $LiCoO_2$ and $LiCo_{2/10}Ni_{5/10}Mn_{3/10}O_2$.

Figure 3:
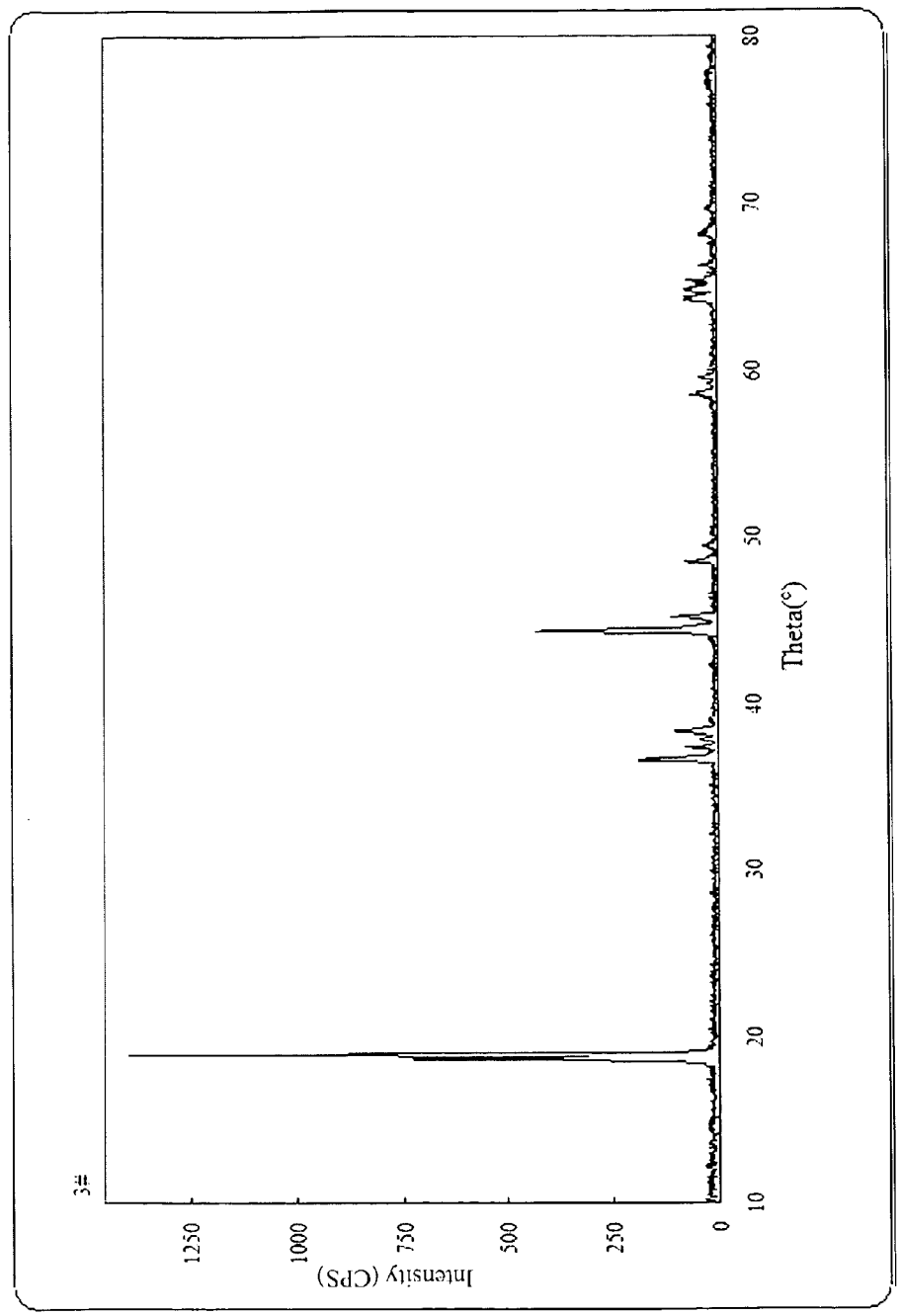
FIG. 3 is a spectrum showing an X-ray diffraction pattern according to an exemplary embodiment 9 of the above preferred embodiment of the present invention.

Referring to FIG. 3, the crystal in embodiment 9 includes: $LiCoO_2$, $LiCo_{2/10}Ni_{5/10}Mn_{3/10}O_2$ and $LiCo_{1/3}Ni_{1/3}Mn_{1/3}O_2$.

The parameters for sintering with intermediate in embodiment 10~12 is shown in Table 2 and the electrical performance is shown in Table 4.

Figure 4:
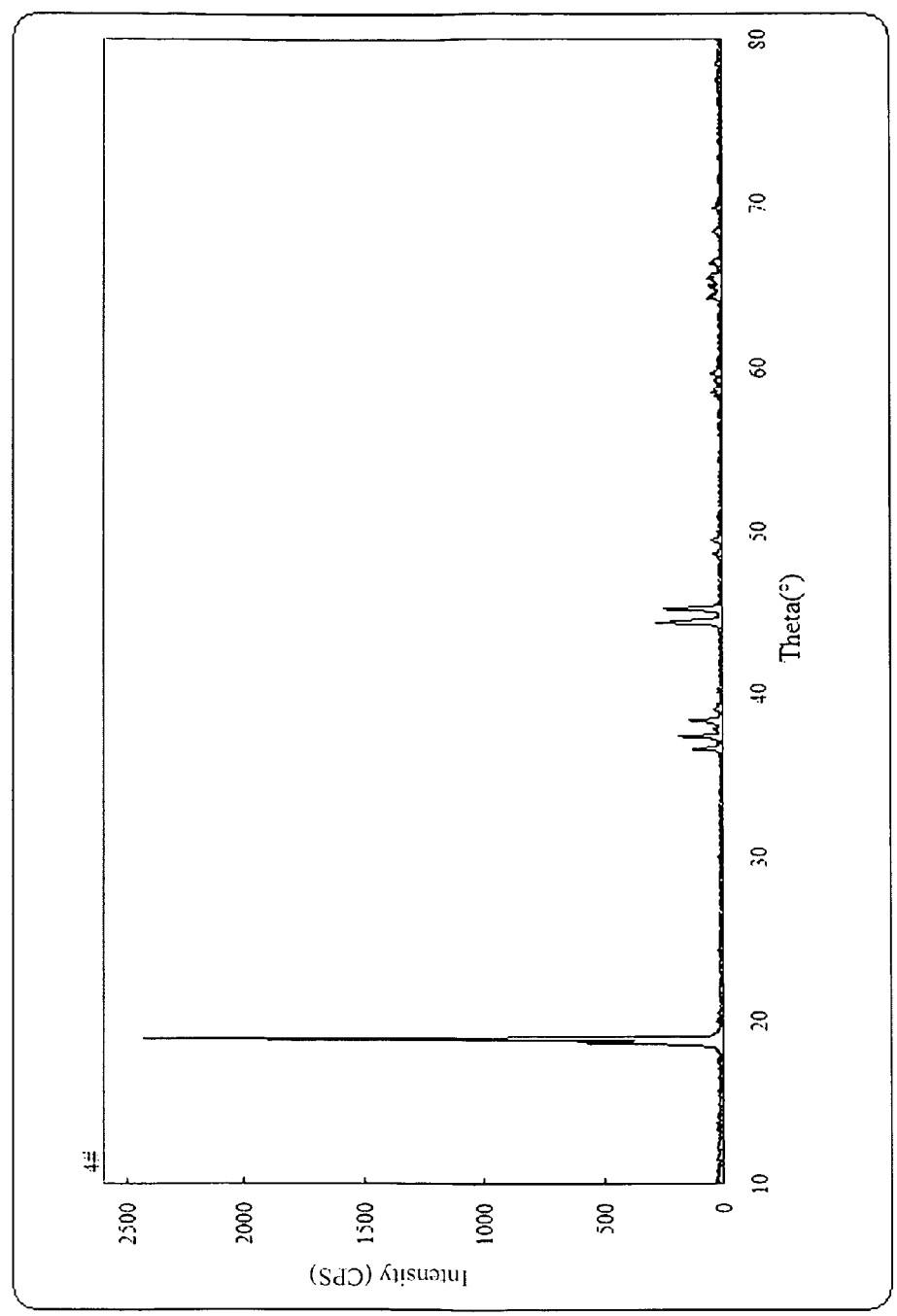
FIG. 4 is a spectrum showing an X-ray diffraction pattern according to an exemplary embodiment 10 of the above preferred embodiment of the present invention.

Referring to FIG. 4, the crystal in embodiment 10 includes: $LiCoO_2$ and $LiCo_{1/3}Ni_{1/3}Mn_{1/3}O_2$.

Figure 5:
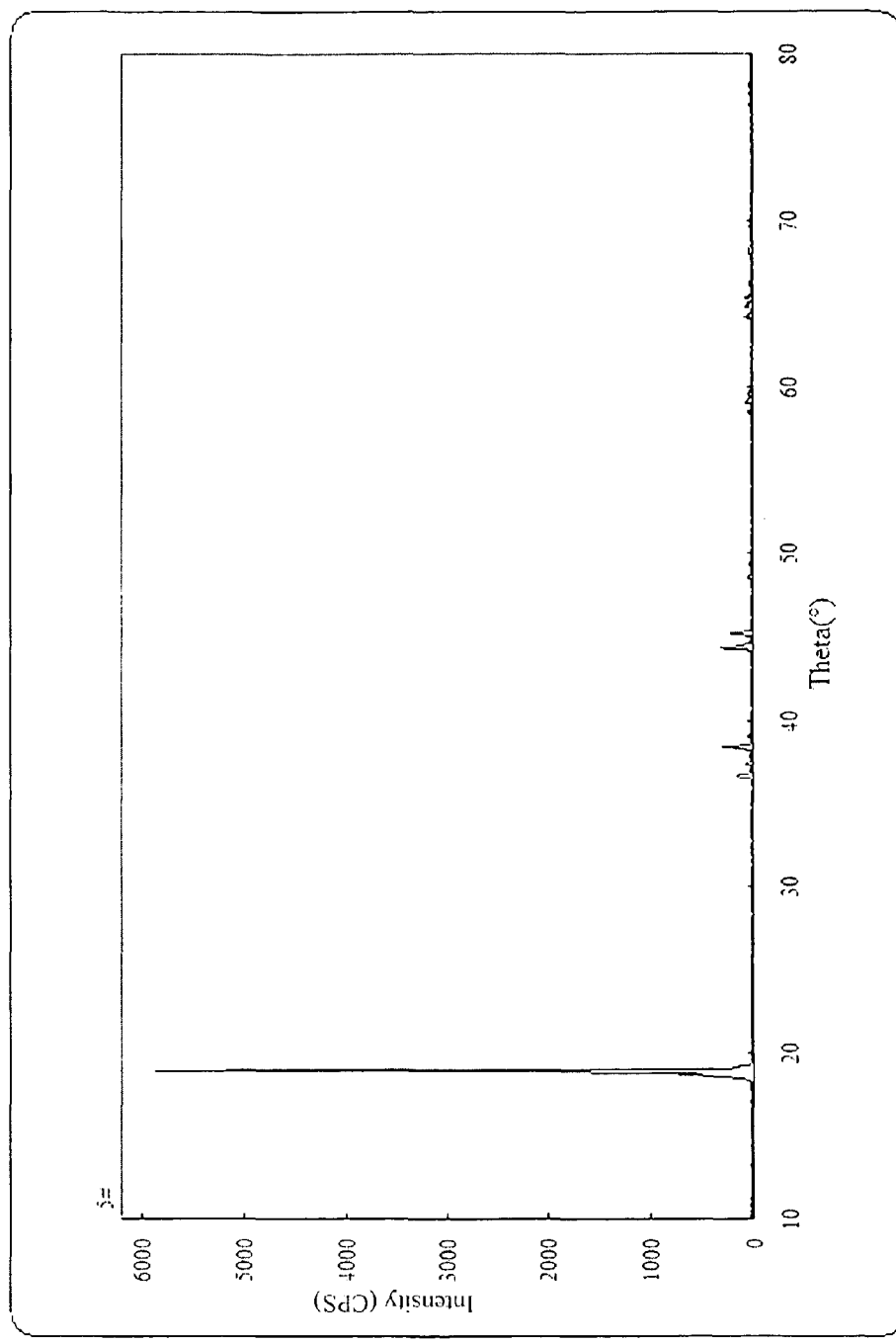
FIG. 5 is a spectrum showing an X-ray diffraction pattern according to an exemplary embodiment 11 of the above preferred embodiment of the present invention.

Referring to FIG. 5, the crystal in embodiment 11 includes: $LiCoO_2$ and $LiCo_{2/10}Ni_{5/10}Mn_{3/10}O_2$.

Figure 6:
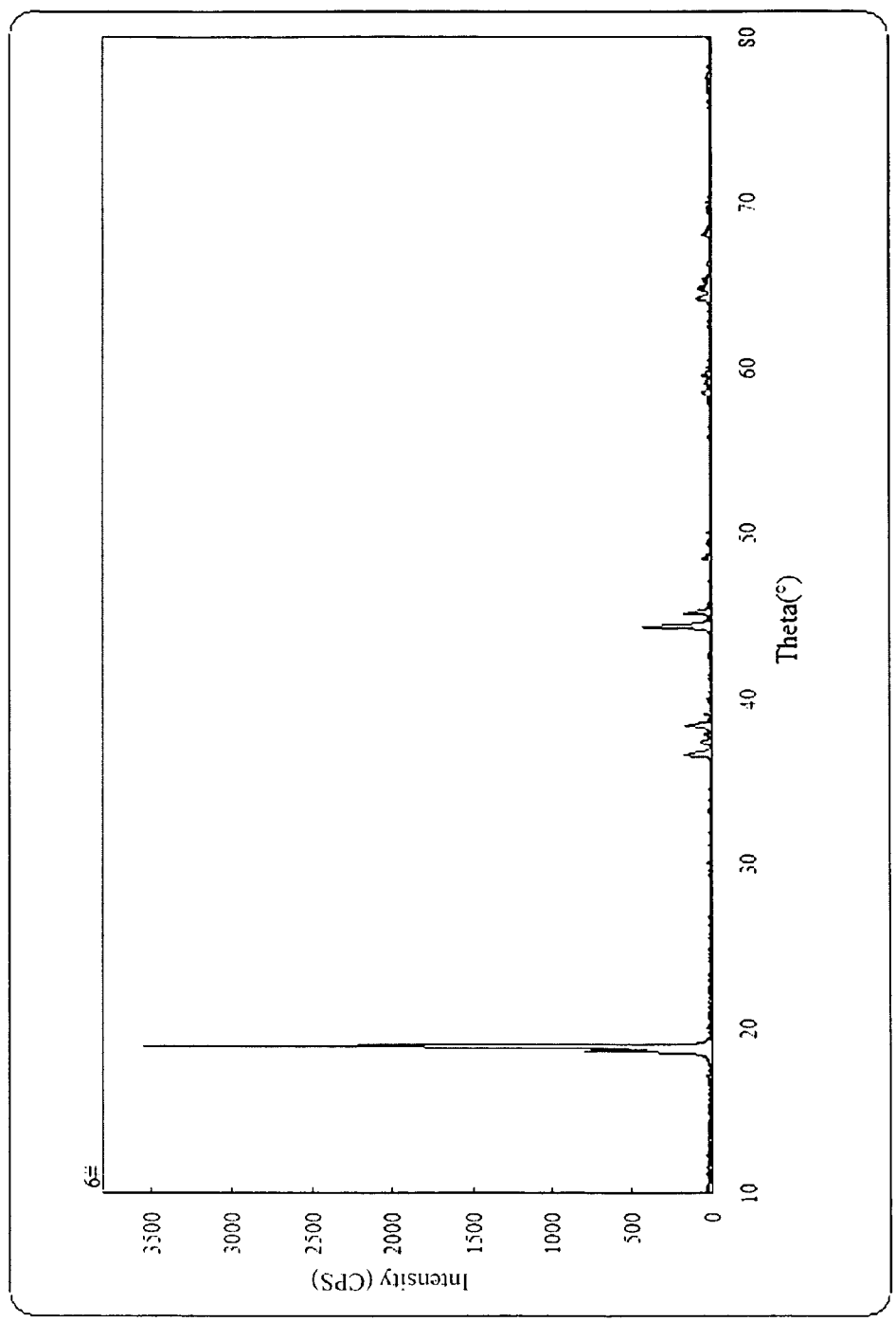
FIG. 6 is a spectrum showing an X-ray diffraction pattern according to an exemplary embodiment 12 of the above preferred embodiment of the present invention.

Referring to FIG. 6, the crystal in embodiment 12 includes: $LiCoO_2$, $LiCo_{1/5}Ni_{2/5}Mn_{2/5}O_2$ and $LiCo_{2/10}Ni_{5/10}Mn_{3/10}O_2$.

The parameters for sintering with final products in embodiment 13~15 is shown in Table 3 and the electrical performance is shown in Table 4.

Figure 7:
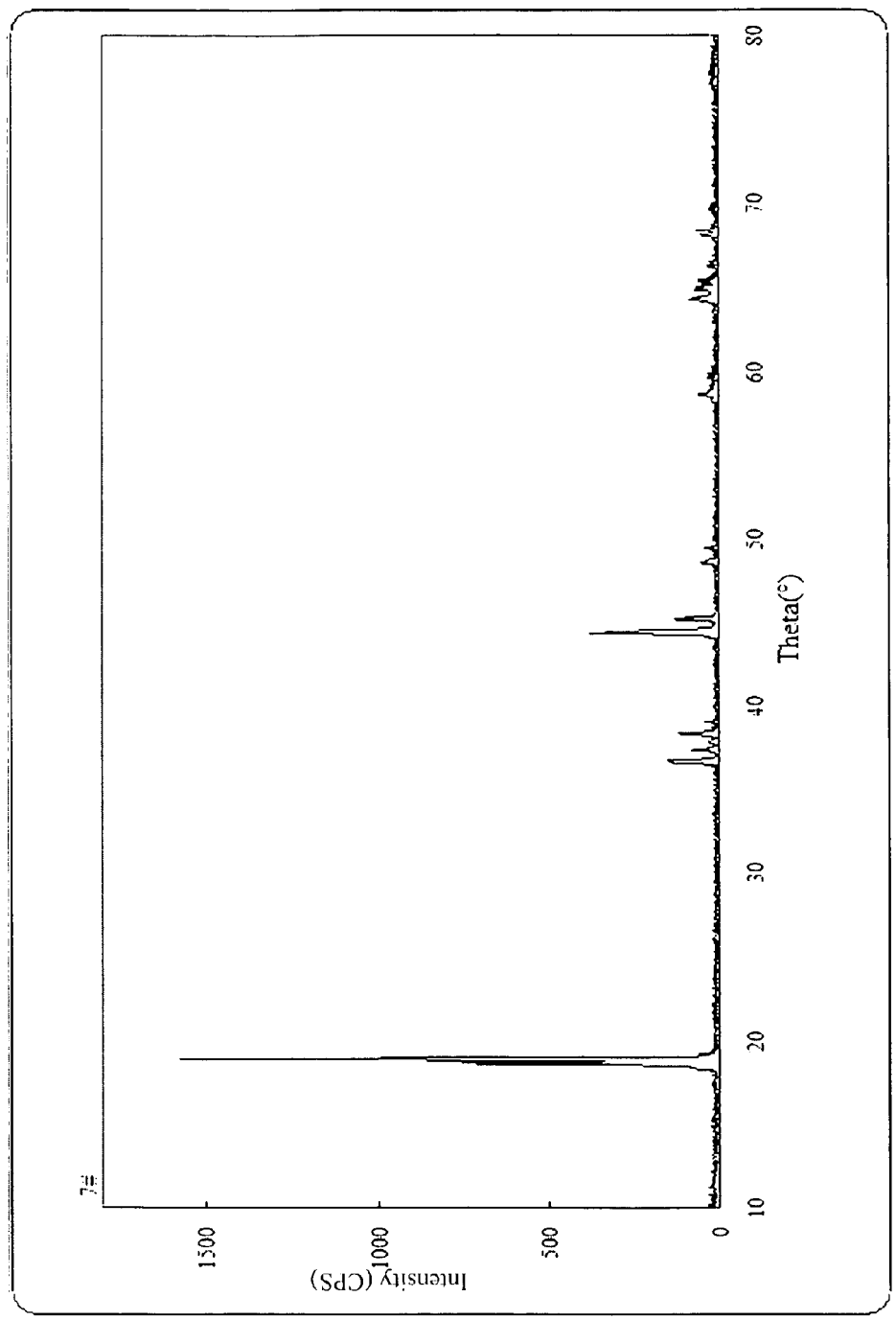
FIG. 7 is a spectrum showing an X-ray diffraction pattern according to an exemplary embodiment 13 of the above preferred embodiment of the present invention.

Referring to FIG. 7, the crystal in embodiment 13 includes: $LiCoO_2$, $LiCo_{1/5}Ni_{2/5}Mn_{2/5}O_2$, $LiCo_{2/10}Ni_{5/10}Mn_{3/10}O_2$ and $LiCo_{1/3}Ni_{1/3}Mn_{1/3}O_2$.

Figure 8:
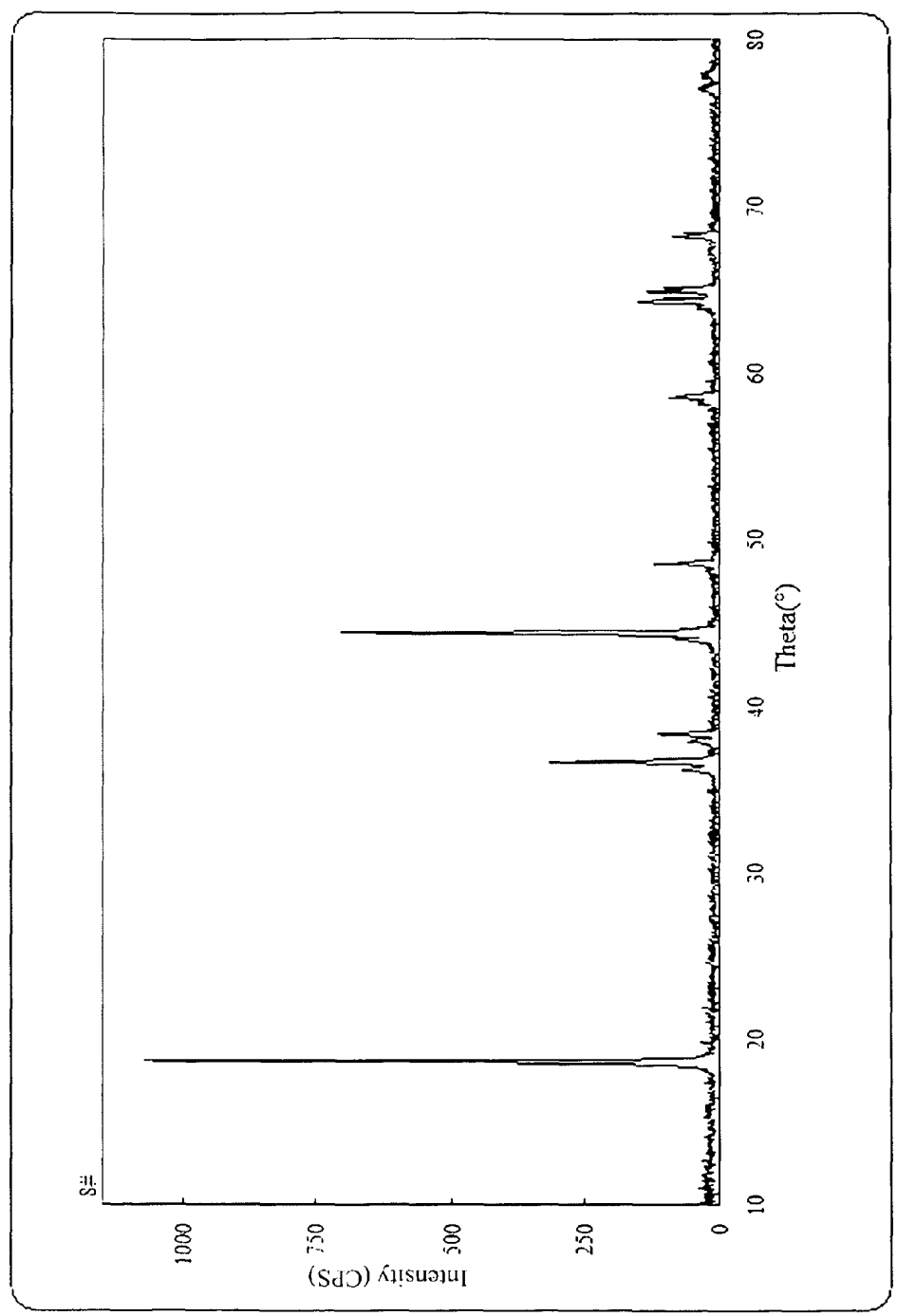
FIG. 8 is a spectrum showing an X-ray diffraction pattern according to an exemplary embodiment 14 of the above preferred embodiment of the present invention.

Referring to FIG. 8, the crystal in embodiment 14 includes: $LiCo_{2/10}Ni_{5/10}Mn_{3/10}O_2$ and $LiMn_2O_4$.

Figure 9:
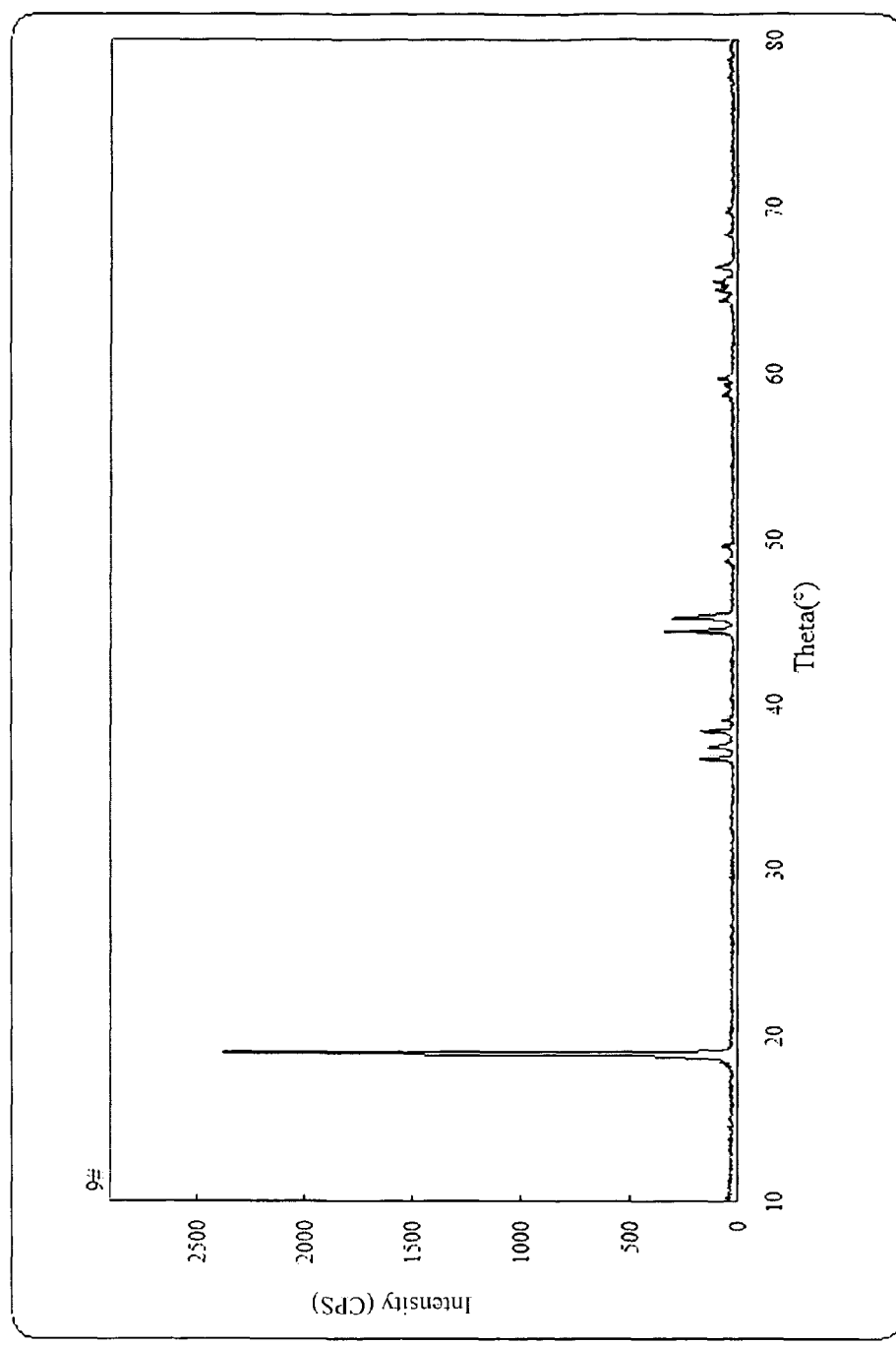
FIG. 9 is a spectrum showing an X-ray diffraction pattern according to an exemplary embodiment 15 of the above preferred embodiment of the present invention.

Referring to FIG. 9, the crystal in embodiment 15 includes: $LiCoO_2$, $LiCo_{2/10}Ni_{5/10}Mn_{3/10}O_2$ and $LiCo_{1/3}Ni_{1/3}Mn_{1/3}O_2$.

Contrast embodiment 1: anode active substances is obtained from cobalt-nickel-manganese ternary battery ZH5000R from Shenzhen Zhenhua New Material Incorporation, where a molar ratio of cobalt, nickel, manganese is 0.2:0.5:0.3, which is prepared into a rectangular Li-ion battery with model number 053048. Its electrical performance is shown in Table 5. The unit volumetric capacity is 560.4 mAh/cm$^2$, retention capacity rate is 94% at 0.5 C~1 C after 100 cycles, 85% after 300 cycles.

Contrast embodiment 2: anode active substances is obtained from lithium cobalt oxide battery ZHT08 from Shenzhen Zhenhua New Material Incorporation, which is prepared into a rectangular Li-ion battery with model number 053048. Its electrical performance is shown in Table 5. The unit volumetric capacity is 577.9 mAh/cm$^2$, retention capacity rate is 90% at 0.5 C~1 C after 100 cycles, 85% after 300 cycles.

Contrast embodiment 3: anode active substances is obtained from cobalt-nickel-manganese ternary battery ZH3000 from Shenzhen Zhenhua New Material Incorporation, where a molar ratio of cobalt, nickel, manganese is 1/3:1/3:1/3, which is prepared into a rectangular Li-ion battery with model number 053048. Its electrical performance is shown in Table 5. The unit volumetric capacity is 480.7 mAh/cm$^3$, retention capacity rate is 95% at 0.5 C~1 C after 100 cycles, 89% after 300 cycles.

According to the above testing results, the polycrystalline composite material according to the preferred embodiment of the present invention has a unit volumetric capacity which is higher than that of the lithium cobalt oxide and single crystalline structure of cobalt-nickel-manganese ternary material. With the requirement of having a compaction density which is higher than 3.9 g/cm$^3$, it is preferably to have a crystalline structure from compound having high nickel content for increasing the energy density.

Table 1 is the parameters for sintering with precursor:

| Method | Embodiment | Precursor | Molecular weight | Ball milling dispersion (rotational speed) | Sinter temperature | Sinter time | Current flow | Particle size (D50) |
|---|---|---|---|---|---|---|---|---|
| with precursor | Embodiment 7 | $LiCoO_2$ | 5 | 300 rpm | 900° C. | 10 hrs | 0.4 Mpa | 13.3 μm |
| | | $LiCo_{1/3}Ni_{1/3}Mn_{1/3}O_2$ | 2 | | | | | |
| | Embodiment 8 | $LiCoO_2$ | 5 | 1000 rpm | 930° C. | 6 hrs | 0.7 Mpa | 10.5 μm |
| | | $LiCo_{2/10}Ni_{5/10}Mn_{3/10}O_2$ | 5 | | | | | |
| | Embodiment 9 | $LiCo_{2/10}Ni_{5/10}Mn_{3/10}O_2$ | 5 | 600 rpm | 920° C. | 8 hrs | 0.9 Mpa | 10.2 μm |
| | | $LiCo_{1/3}Ni_{1/3}Mn_{1/3}O_2$ | 1 | | | | | |
| | | $LiCoO_2$ | 3 | | | | | |

Table 2 is the parameters for sintering with intermediate:

| Method | Embodiment | Precursor | Molecular weight | Intermediate Initial Sinter temperature | Sinter time | Sinter temperature | Sinter time | Current flow | Particle size (D50) |
|---|---|---|---|---|---|---|---|---|---|
| with intermediate | Embodiment 10 | $LiCoO_2$ | 5 | 600° C. | 15 hrs | 950° C. | 8 hrs | 0.4 Mpa | 14.5 μm |
| | | $LiCo_{1/3}Ni_{1/3}Mn_{1/3}O_2$ | 3 | 850° C. | 10 hrs | | | | |
| | Embodiment 11 | $LiCoO_2$ | 5 | 850° C. | 5 hrs | 850° C. | 10 hrs | 0.7 Mpa | 9.3 μm |
| | | $LiCo_{2/10}Ni_{5/10}Mn_{3/10}O_2$ | 4 | 800° C. | 10 hrs | | | | |
| | Embodiment 12 | $LiCo_{2/10}Ni_{5/10}Mn_{3/10}O_2$ | 5 | 800° C. | 10 hrs | 980° C. | 4 hrs | 0.9 Mpa | 10.9 μm |
| | | $LiCo_{1/5}Ni_{2/5}Mn_{2/5}O_2$ | 2 | 750° C. | 15 hrs | | | | |
| | | $LiCoO_2$ | 4 | 600° C. | 15 hrs | | | | |

Table 3 is the parameters for sintering with final product:

| Method | Embodiment | Precursor | Molecular weight (mol) | Single Crystal Sinter temperature | Sinter time | Sinter temperature | Sinter time | Current flow | Particle size (D50) |
|---|---|---|---|---|---|---|---|---|---|
| with final product | Embodiment 13 | $LiCoO_2$ | 5 | 890° C. | 10 hrs | 850° C. | 2 hrs | 0.6 Mpa | 13.9 μm |
| | | $LiCo_{1/5}Ni_{2/5}Mn_{2/5}O_2$ | 1 | 960° C. | 10 hrs | | | | |
| | | $LiCo_{2/10}Ni_{5/10}Mn_{3/10}O_2$ | 4 | 920° C. | 8 hrs | | | | |
| | | $LiCo_{1/3}Ni_{1/3}Mn_{1/3}O_2$ | 2 | 920° C. | 8 hrs | | | | |
| | Embodiment 14 | $LiCo_{2/10}Ni_{5/10}Mn_{3/10}O_2$ | 5 | 980° C. | 10 hrs | 350° C. | 5 hrs | 0.9 Mpa | 10.7 μm |
| | | $LiMn_2O_4$ | 1 | 850° C. | 8 hrs | | | | |
| | | $LiCoO_2$ | 4 | 910° C. | 7 hrs | | | | |
| | Embodiment 15 | $LiCoO_2$ | 6 | 900° C. | 10 hrs | 650° C. | 4 hrs | 0.5 Mpa | 11.2 μm |
| | | $LiCo_{2/10}Ni_{5/10}Mn_{3/10}O_2$ | 4 | 920° C. | 8 hrs | | | | |
| | | $LiCo_{1/3}Ni_{1/3}Mn_{1/3}O_2$ | 2 | 920° C. | 8 hrs | | | | |

Table 4 shows the electrical testing results of embodiment 7~15.

| | composition | Anode properties | | Initial | Unit volume | capacity retention rate | | |
|---|---|---|---|---|---|---|---|---|
| Embodiment | ratio Co:Ni:Mn mol | Compaction density g/cm³ | electrode capacity humidity ≤75% | capacity mAh/g 1 C | capacity mAh/cm³ | 50 cycles % | 150 cycles % | 300 cycles % |
| Embodiment 7 | 80:10:10 | 4.0 | 48 hr no shredding | 145.1 | 580.4 | 96 | 92 | 86 |
| Embodiment 8 | 65:25:15 | 3.96 | 48 hr no shredding | 147.2 | 582.9 | 94 | 90 | 87 |
| Embodiment 9 | 48:32:20 | 3.91 | 48 hr no shredding | 148.8 | 581.8 | 96 | 89 | 86 |
| Embodiment 10 | 75:12.5:12.5 | 4.0 | 48 hr no shredding | 145.2 | 580.8 | 97 | 93 | 87 |
| Embodiment 11 | 64:22:14 | 3.95 | 48 hr no shredding | 147.8 | 585.3 | 96 | 91 | 88 |
| Embodiment 12 | 50:30:20 | 3.92 | 48 hr no shredding | 149.3 | 585.3 | 96 | 92 | 87 |
| Embodiment 13 | 55.5:25.5:19.0 | 3.9 | 48 hr no shredding | 147.2 | 574.1 | 94 | 89 | 83 |
| Embodiment 14 | 14:36:50 | 3.91 | 48 hr no shredding | 146.3 | 572.0 | 98 | 92 | 88 |
| Embodiment 15 | 62:22:16 | 3.97 | 48 hr no shredding | 149.5 | 593.5 | 97 | 89 | 86 |

Table 5 shows the electrical performance of contrast embodiment.

| | composition | Anode properties | | Initial | Unit | capacity retention rate | | |
|---|---|---|---|---|---|---|---|---|
| Contrast Embodiment | ratio Co:Ni:Mn mol | Compaction density g/cm³ | electrode capacity humidity ≤75% | capacity mAh/g 1 C | volume capacity mAh/cm³ | 50 cycles % | 150 cycles % | 300 cycles % |
| Contrast Embodiment 1 | 20:50:30 | 3.62 | 48 hr no shredding | 154.8 | 560.4 | 96 | 94 | 85 |
| Contrast Embodiment 2 | 100:00:00 | 4.05 | 48 hr no shredding | 142.7 | 577.9 | 96 | 90 | 84 |
| Contrast Embodiment 3 | 33.3:33.3:33.3 | 3.35 | 48 hr no shredding | 143.5 | 480.7 | 97 | 95 | 89 |

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A polycrystalline cobalt-nickel-manganese ternary anode material, wherein said polycrystalline cobalt-nickel-manganese ternary anode material comprises two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y is smaller than 1, z is greater than or equal to 1, wherein said lattice structure is a polycrystalline layered structure, wherein a molar ratio of element lithium:cobalt:nickel:manganese is 1~1.2:0.4~0.7:0.2~0.5:0.1~0.3, wherein said polycrystalline layered structure has a particle size between 8~12 micron, wherein said polycrystalline cobalt-nickel-manganese ternary anode material has a compaction density of 3.9~4.3 g/cm³, a capacity which is greater than or equal to 145 mAh/g at a discharge current of 0.5~1 C, and a capacity retention rate which is greater than 90% after 300 cycles.

2. A secondary lithium ion battery which has an anode material, wherein said anode material is a polycrystalline anode material which comprises two or more basic lattice structures selected from the group consisting of $Li_zCoO_2$, $Li_zNiO_2$, $Li_zMnO_2$, $Li_zCo_{1-(x+y)}Ni_xMn_yO_2$, $Li_zNi_xMn_{1-x}O_2$, $Li_zCo_xNi_{1-x}O_2$, $Li_2MnO_3$, where x, y and x+y is smaller than 1, z is greater than or equal to 1, wherein said lattice structure is a polycrystalline layered structure, wherein a molar ratio of element lithium:cobalt:nickel:manganese is 1~1.2:0.4~0.7:0.2~0.5:0.1~0.3, wherein said polycrystalline layered structure has a particle size between 8~12 micron, wherein said polycrystalline cobalt-nickel-manganese ternary anode material has a compaction density of 3.9~4.3 g/cm³, a capacity which is greater than or equal to 145 mAh/g at a discharge current of 0.5~1 C, and a capacity retention rate which is greater than 90% after 300 cycles.

* * * * *